United States Patent
Nozaki et al.

(10) Patent No.: US 7,249,160 B2
(45) Date of Patent: Jul. 24, 2007

(54) ELECTRONIC MAIL PROCESSING SYSTEM AND MAIL SERVER

(75) Inventors: Takashi Nozaki, Tokyo-to (JP); Akiko Nagano, Tokyo-to (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 636 days.

(21) Appl. No.: 10/081,647

(22) Filed: Feb. 21, 2002

(65) Prior Publication Data
US 2002/0129109 A1 Sep. 12, 2002

(30) Foreign Application Priority Data
Mar. 9, 2001 (JP) ............................ P2001-067210

(51) Int. Cl.
*G06F 15/16* (2006.01)
(52) U.S. Cl. ...................... 709/206; 709/200; 709/204; 709/246
(58) Field of Classification Search ................. 709/206
See application file for complete search history.

(56) References Cited

U.S. PATENT DOCUMENTS

| | | | | |
|---|---|---|---|---|
| 6,076,101 | A * | 6/2000 | Kamakura et al. | 709/206 |
| 6,192,258 | B1 * | 2/2001 | Kamada et al. | 455/566 |
| 6,202,086 | B1 * | 3/2001 | Maruyama et al. | 709/206 |
| 6,622,174 | B1 * | 9/2003 | Ukita et al. | 709/246 |
| 2001/0005854 | A1 * | 6/2001 | Murata et al. | 709/206 |
| 2001/0005861 | A1 * | 6/2001 | Mousseau et al. | 709/245 |
| 2002/0131561 | A1 * | 9/2002 | Gifford et al. | 379/67.1 |

FOREIGN PATENT DOCUMENTS

| | | |
|---|---|---|
| EP | 0 908 835 | 4/1999 |
| WO | 00/44137 | 7/2000 |
| WO | 01/13656 | 2/2001 |
| WO | 02/07020 | 1/2002 |

* cited by examiner

*Primary Examiner*—Rupal Dharia
*Assistant Examiner*—Nicholas Taylor
(74) *Attorney, Agent, or Firm*—Ladas & Parry LLP

(57) ABSTRACT

An electronic mail (email) processing system set up on the Internet includes terminals that send and receive email messages, cellular telephones that send and receive email messages by radiocommunication through base stations, a mail server that performs the overall management of an email service, a client database, provided within the mail server, for storing user information about registered users who are clients of the email service, and a map database center and a map information provider site, both of which perform a map information providing function. In a specific embodiment, the mail server receives an email message sent from a terminal, adds, to the received email message, telephone number data and position information-associated map link information, which are items of the user information, and forwards the resultant email message to one or more recipient cellular telephones.

10 Claims, 3 Drawing Sheets

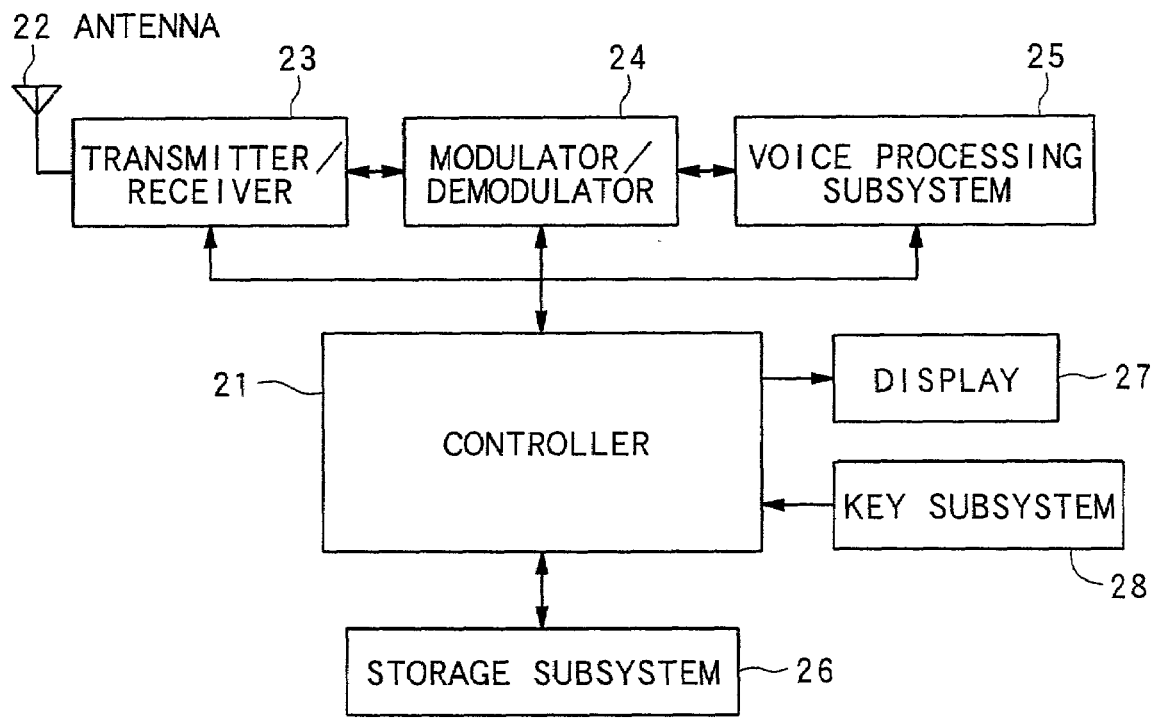

HI! REGARDING THE MATTER WE TALKED ABOUT
THE OTHER DAY, I WOULD APPRECIATE
IF YOU COULD COME TO MY HOME NEXT SUNDAY.
MY TELEPHONE NUMBER AND ADDRESS
ARE INDICATED BELOW. PLEASE CLICK ON THE
MAP LINK BELOW IN ORDER TO VIEW THE MAP.

TELEPHONE NUMBER : 03-△△△△-△△△△

MAP LINK : http:/www./mapfan/map/pos?longitude=E ················

ELECTRONIC MAIL PROCESSING SYSTEM AND MAIL SERVER

BACKGROUND OF THE INVENTION

1. Field of the Invention

The present invention relates generally to electronic mail (email) processing systems that transfer email sent from a sender terminal to recipient terminals via a network. More particularly, the invention relates to an email processing system that forwards email to recipients by adding predetermined items of user information to the email.

2. Description of the Related Art

The proliferation of the Internet in recent years has promoted email-based data communications among terminals of different types. Email is a simple and quick device of conveying messages, since a message composed on a terminal by a user who can use email can be readily received by one or more recipient terminals once sent to a mail server via the Internet. Today, Internet-capable cellular telephones are among those email-supporting terminals, and many of their users exchange email messages with other cellular telephones, personal computers, and/or other like devices.

In some features provided by prior art email processing systems, when a user includes one or more links such as various addresses in message text, a recipient can activate these links at the recipient terminal. For example, when a function called "Mail To" is used, the recipient user specifies (i.e., clicks on) an email address written on the message text through the recipient terminal to give a reply to that email address immediately. If the recipient terminal is a cellular telephone, a function called "Phone To" can also be available. The recipient user, who is the user of the cellular telephone, similarly specifies a telephone number written on the message text to dial that telephone number immediately. These functions provide recipient terminals with ease for connection to links through a network, and hence make email more useful.

If a sender user utilizes the Phone To function when sending email to a user carrying a cellular telephone, the recipient user can call the sender user without looking up the sender user's telephone number, which is of great convenience. However, the sender user must add telephone number data to message text every time he/she sends email, which is troublesome.

Moreover, if a map information provider site on the Internet is utilized, a recipient user searches for map information corresponding to an address (hereinafter meaning strictly "place of residence" as distinguished from "email address") written on message text so that a recipient user can have a map image around that address displayed on a recipient terminal. However, the sender user must again add text data representing an address to message text, and go through an operation of searching for map information around the address every time he/she sends email, which is likewise troublesome.

Thus, the prior-art email processing systems have involved time-consuming, troublesome operations of entering telephone numbers, etc. even if sender users utilize various link information-related functions when sending email.

SUMMARY OF THE INVENTION

The present invention has been made in view of the above circumstances. It is, therefore, an object of the invention to provide an email processing system and a mail server which can add useful information to email messages automatically without troublesome operation so that a recipient can, for example, dial a telephone number added to received email and/or view map information based on map link information added to received email.

The above object of the present invention can be achieved by an electronic mail processing system that processes email messages sent via a network, said system provided with: a plurality of terminals each provided with a function to send and receive the email messages through said network; a user information storage device for storing user information corresponding to registered users; an email adding device for referencing said user information storage device upon receipt of each of the email messages sent from said terminals, acquiring at least one predetermined item of said user information corresponding to users using said terminals, and adding said item of said user information to the email message; and an email forwarding device for forwarding the email message to which said predetermined item of said user information is added, to said terminals specified as recipients.

According to the invention, a user entitled to an email service has his/her user information stored in the user information storage device such as a database, and when the user sends an email message to the mail server via the network, the mail server retrieves predetermined items of the user information, such as a telephone number and/or an address, and adds the retrieved items of the user information to the received email message and thereafter forwards the resultant email message to one or more recipient users. Thus, the sender user does not have to add information such as a telephone number and/or an address to the message text, but the email processing system automatically does this job on behalf of the sender user so that the recipient users can receive the email message with such information added thereto, whereby an email processing system is provided, which requires no troublesome operation and which is hence highly convenient.

In one aspect of the system of the present invention, wherein said user information includes telephone number data, and wherein said email adding device adds the telephone number data to the email message.

According to the invention, the telephone number data is added to the email message as a predetermined item of the user information referred to in the invention according to claim 1, whereby a sender user can inform recipient users of a telephone number without performing the troublesome operation when sending an email message.

In another aspect of the system of the present invention, wherein said plurality of terminals include terminals having a telephone function by which a call operation is initiated to a link indicated by the telephone number data based on a predetermined operation.

According to the invention, the recipient users who have received the information-added email message can call a party indicated by the telephone number data when, for example, clicking on that telephone number data using the recipient terminals, whereby the troublesome operation of making a telephone call on the part of recipient users can be simplified.

In further aspect of the system of the present invention, wherein said user information includes position information, and wherein said email adding device adds the position information to the email message.

According to the invention, the position information, such as an address, is added to the email message as a predetermined item of the user information referred to in the invention according to claim 1, whereby a sender user can inform recipient users of position information without performing the troublesome operation when sending an email message.

In further aspect of the system of the present invention, wherein said user information includes position information and map link information corresponding to the position information, and wherein said email adding device adds the map link information to the email message.

According to the invention, the map information corresponding to the position information, such as latitude/longitude information, is added to the email message as a predetermined item of the user information referred to in the invention according to claim 1, whereby a sender user can inform recipient users of map link information necessary to acquire map information via a network without performing the troublesome operation when sending an email message.

In further aspect of the system of the present invention, wherein said plurality of terminals include terminals having an Internet access function and a display device, and wherein when said email forwarding device forwards the email message to which the map link information is added, the Internet access function allows map information to be acquired from an Internet site indicated by the map link information based on a predetermined operation, to display an image corresponding to the map information on said display device.

According to the invention, the recipient users who have received the email message to which the map link information is added can connect to the Internet for access to a site indicated by the map link information to acquire map information and display a map image on the display device when, for example, clicking on that map link information using the recipient terminals, whereby the troublesome operation of acquiring map information on the Internet on the part of recipient users can be simplified.

In further aspect of the system of the present invention, wherein said plurality of terminals include portable terminals each provided with a function to send and receive the email messages by radiocommunication via base stations.

According to the invention, the email message is sent to the portable terminals by radiocommunication, with predetermined items of user information added thereto as mentioned above. Thus, for example, a recipient user can call a sender user upon receipt of an email message outdoors, and/or can check a location upon viewing a map image, whereby a more useful email processing system can be provided, which can accommodate various user needs in various operating environments.

In further aspect of the system of the present invention, wherein said portable terminals include portable terminals provided with said telephone function.

According to the invention, extensively used portable terminals, such as cellular telephones, can enjoy convenience similar to that provided by the invention according to claim 8.

The above object of the present invention can be achieved by a mail server for processing email messages sent via a network to which a plurality of terminals are connected, said mail server provided with: a user information storage device for storing user information corresponding to registered users; an email adding device for referencing said user information storage device upon receipt of each of the email messages sent from said terminals, acquiring at least one predetermined item of said user information corresponding to users using said terminals, and adding said item of said user information to the email message; and an email forwarding device for forwarding the email message to which said predetermined item of said user information is added, to said terminals specified as recipients.

According to the invention, the mail server connected to the network can be used to set up an email processing system similar to the invention according to claim 1, whereby an email service can be provided under centralized management and with ease for commercialization.

In one aspect of the mail server of the present invention, wherein said user information includes telephone number data, and wherein said email adding device adds the telephone number data to the email message.

According to the invention, the telephone number data is added to the email message as a predetermined item of the user information referred to in the invention according to claim 9, whereby advantages similar to those of claim 2 can be obtained with a simple process.

In another aspect of the mail server of the present invention, wherein said user information includes position information, and wherein said email adding device adds the position information to the email message.

According to the invention, the position information, such as an address, is added to the email message as a predetermined item of the user information referred to in the invention according to claim 9, whereby advantages similar to those of claim 4 can be obtained with a simple process.

In further aspect of the mail server of the present invention, wherein said user information includes position information and map link information corresponding to the position information, and wherein said email adding device adds the map link information to the email message.

According to the invention, the map link information corresponding to the position information, such as latitude/longitude information, is added to the email message as a predetermined item of the user information referred to in the invention according to claim 9, whereby advantages similar to those of claim 5 can be obtained with a simple process.

BRIEF DESCRIPTION OF THE DRAWINGS

FIG. 2 is a block diagram showing an overview configuration of a cellular telephone;

FIG. 3 is a diagram showing a user registration page displayed for user interaction with a terminal;

DETAILED DESCRIPTION OF THE PREFERRED EMBODIMENTS

Figure 1:
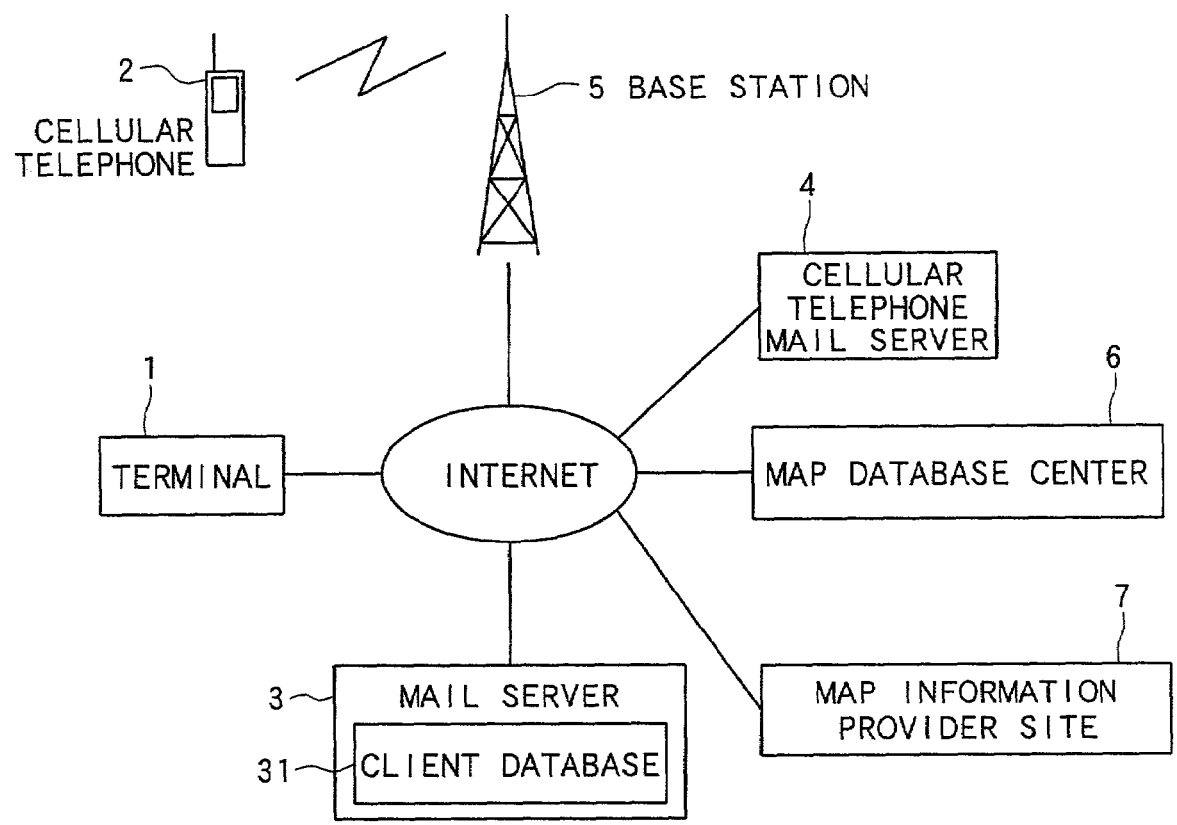
FIG. 1 is a block diagram showing the configuration of an email processing system according to an embodiment of the invention.

Referring now to FIG. 1, an electronic mail (email) processing system according to an embodiment of the invention includes email-capable terminals, such as a terminal 1, which may include but not be limited to a personal computer (PC), and a cellular telephone 2 having both traditional telephone functions and Internet functions. While only one terminal 1 and only one cellular telephone 2 are shown in FIG. 1, a larger number of terminals 1 and cellular telephones 2 are actually involved. In addition to these terminals, the email processing system according to this embodiment also includes a mail server 3 as its core component, a cellular telephone mail server 4 that provides the cellular telephone 2 with email functionality, a base station 5 for radiocommunicating with the cellular telephone 2, a map database center 6, and a map information provider site 7. Theses components are each connected to the Internet for data communication with one another. Although only one base station 5 is shown in FIG. 1, a larger number of base stations are actually involved.

In the above configuration, the terminal 1 may be, for example, a PC that includes hardware and software for email massaging to communicate with other terminals 1 or cellular telephones 2, and for browsing various information by accessing sites on the Internet. To use an email service, which will be described below, the user operating the terminal 1 must be added to a client database 31 incorporated in the mail server 3 to be a registered user.

The cellular telephone 2 generally provides traditional telephone call functions, as well as additional functions to access various Internet sites and send and receive email to and from other cellular telephones 2 and terminals 1. It should be noted that the cellular telephones 2 can be replaced with portable information terminals which can exchange data over a similar network.

Referring next to FIG. 2, the cellular telephone 2 includes a controller 21 that controls the overall operation, an antenna 22 that transmits and receives radio waves, a transmitter/receiver 23 that performs transmitting and receiving operations, a modulator/demodulator 24 that modulates signals to be transmitted and demodulates signals received, a voice processing subsystem 25 including various processing circuits for voice signals, a storage subsystem 26 that stores data and programs necessary for processing performed by the controller 21, a display 27, constructed of a liquid-crystal panel or the like, for displaying characters and graphics on a screen, and a key subsystem 28 that outputs key data corresponding to operations performed using keys.

The mail server 3 supervises the overall operation of the email service according to this embodiment. The mail server 3 incorporates the client database 31 that stores various information about clients who utilize the email service. The client database 31 is a user information storage device that stores user information about users who have been registered as clients of the email service. The mail server 3 receives email from the terminal 1, confirms the email as a message from a registered user referring to the client database 31, adds to the email only predetermined items of user information (which items will be described below), and then forwards the email to one or more recipient users with the predetermined items added to the email. The functions and processing to be performed by the mail server 3 will be detailed below.

The cellular telephone mail server 4 sends, receives, and stores email messages for email-capable cellular telephones 2. Thus, any email message under way between a terminal 1 and a cellular telephone 2 is to be routed through both the mail server 3 and the cellular telephone mail server 4.

The base stations 5 are arranged each at areas where the users of the cellular telephones 2 are located. The cellular telephone 2 can, after establishing wireless connection with an adjacent base station 5, conduct radiocommunication via the base station 5. Each base station 5 is connected to the Internet through a gateway (not shown), for Internet access by the corresponding cellular telephone 2.

The map database center 6 and the map information provider site 7 provide map information as their functions assigned to implement the email service according to this embodiment. In the map database center 6, the map information is accumulated and managed in a database while associated with position information (latitude/longitude information). The map information includes image data for displaying map images corresponding to a plurality of hierarchical layers of different scales. The map database center 6 performs, in response to a map information request submitted via the map information provider site 7, a search process, and the searched map information corresponding to the specified position information is transmitted to the specified recipient's email address via the map information provider site 7.

The map information provider site 7 is set up on the Internet to provide various information relating to specified position information via the Internet. The map information provider site 7 stores pertinent information such as addresses and landmarks associated with position information, and outputs the stored information upon demand. When a user accesses the site 7 and specifies position information, the site 7 requests the map database center 6 to search for map information corresponding to the specified position information.

Next, the email service provided by the email processing system according to this embodiment will be described. As previously mentioned, this email service is to be rendered to the users who have been registered to the client database 31. Thus, a user registration process and user information to be stored in the client database 31 will be described with reference to FIG. 3 which shows a user registration page displayed for user interaction with a terminal.

As shown in the figure, the user registration page includes text data entry fields for entering user information for registration such as the user's email address, name, sex, age, telephone number, and address. A user enters these text data items to the corresponding fields directly, or, as to sex and age, selects data from the corresponding pull-down menus. The user then follows a predetermined operation to transmit the entered registration data to the mail server 3 via the Internet.

In receipt of the registration data, the mail server 3 accesses the map database center 6 to acquire latitude/longitude information and a link, which is a URL or uniform resource locator, corresponding to the latitude/longitude information, based on the address transmitted as the entered data from the user. The link is supposed to be the URL of the map information provider site 7 in this embodiment. Then, the mail server 3 sets the acquired latitude/longitude information and URL as map link information, and stores, in the client database 31, the user information including the entered data such as the user's telephone number and the map link information. From then on, every time the user logs in for the email service according to this embodiment, the mail server 3 references the client database 31 to acquire predetermined items of his/her user information.

Next, how a registered user sends email will be described, taking an example of a message originated from the terminal 1 and destined for the cellular telephone 2. First, the user starts an email processing application software through interaction with the terminal 1 to compose a desired message. The email service according to this embodiment processes the message in the following manner to implement the Phone To and Map Link functions.

Figures 4, 5:
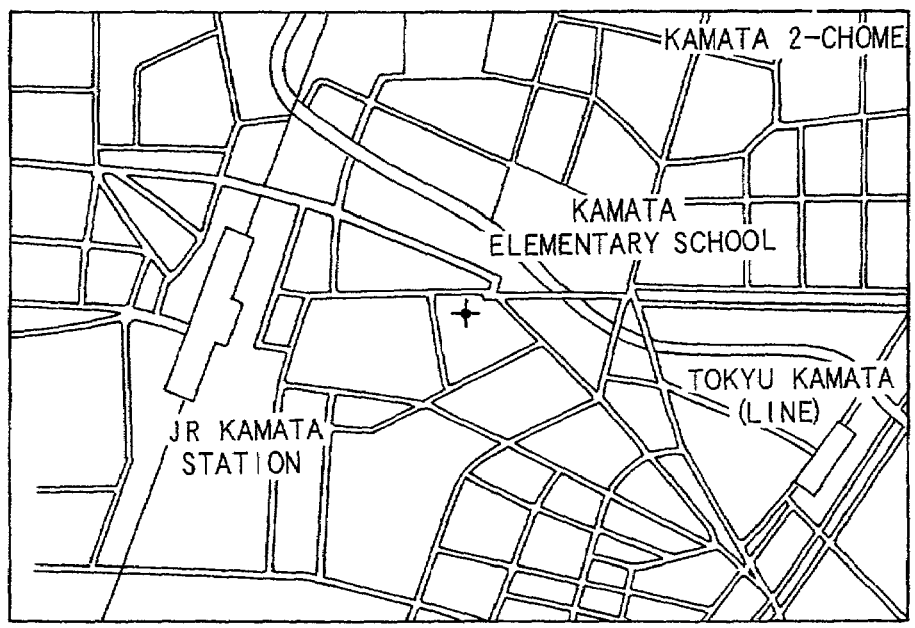
FIG. 4 is a diagram explaining email compatible with the Phone To and Map Link functions.
FIG. 5 is a diagram showing one example of a map displayed on the display of the cellular telephone based on the Map Link function.

FIG. 4 explains email compatible with the Phone To and Map Link functions. First, the user prepares only the text of an email message. Then, the user specifies a recipient, specifies use of this email service, and finally executes to send the message, through the email processing application.

As a result, the mail server 3 receives the message and temporarily houses it for the following process.

The mail server 3 references the client database 31 to confirm that the received message was sent from a registered user, and then acquires telephone number data and map link information from the user information of interest stored in the database 31 as the above-mentioned predetermined items, and adds the acquired data to the received message. Specifically, as shown in FIG. 4, the telephone number data corresponding to the Phone To function is added to the lower part of the text of the received message, and so are the URL of the map information provider site 7 and the latitude/longitude information as the map link information corresponding to the Map Link function, under the captions: "Telephone number" and "Map link," as link information.

The mail server 3 then forwards the email message including such link information to the cellular telephone mail server 4. The cellular telephone mail server 4 associates the received message with a recipient's email address, and houses that message. When a user having the recipient's email address accesses the cellular telephone mail server 4 utilizing the email function supported by his/her cellular telephone 2, the server 4 sends that message which has been housed therein. As a result, the recipient cellular telephone 2 receives that message via the Internet, and the recipient user hence can view a screen such as shown in FIG. 4 on the display 27.

Referring continuously to FIG. 4, the Phone To and Map Link functions performed by the recipient cellular telephone 2 will be described. To use the Phone To function, the user of the cellular telephone 2 operates the key subsystem 28 to select the telephone number displayed on the screen of FIG. 4 (by, for example, using a scroll key) and confirms the selection (by, for example, pressing an "OK" key). Then, the controller 21 starts a process corresponding to the Phone To function. Specifically, the controller 21 analyzes text data representing the telephone number, and then initiates to call the telephone number identified based on the analysis. As a result, the cellular telephone 2 rings up the home of the user who sent the email message.

On the other hand, to use the Map Link function, the user of the cellular telephone 2 operates the key subsystem 28 to select the map link information shown on the screen of FIG. 4 (i.e., the URL of the map information provider site 7 and the latitude/longitude information) (by, for example, using the scroll key) and confirm the selection (by, for example, pressing the OK key). Then, the controller 21 starts accessing the Internet. Specifically, the controller 21 acquires the URL of the map information provider site 7, and connects to the Internet to access the map information provider site 7. Then, the above-mentioned process involving the map information provider site 7 is performed to acquire map information about a predetermined area based on the latitude/longitude information from the map database center 6, and the acquired map information and its pertinent data are transmitted to the cellular telephone 2. As a result, the cellular telephone 2 allows its user to view on the display 27 a map covering the home of the user who has sent the email message.

As shown in FIG. 5, in the map, in one embodiment, which the recipient user views on the display 27 based on the Map Link function, the home of the sender user is shown at the center with a denotation "+" which corresponds to the latitude/longitude information, and so is its neighborhood on a predetermined scale. Above the map is shown the location data (i.e., the address) of the sender user, which is indicated in the form of text data. In some embodiments, the user of the cellular telephone 2 may scroll the map of FIG. 5 and change its scale by operating the key subsystem 28.

As described above, the email processing system according to this embodiment can provide both a user sending email and a user receiving the email with a highly convenient email service. That is, on one hand, the sender user can dispense with the troublesome operation of inserting his/her telephone number, address, etc. into the text of an email message, and can send the message with such information automatically added to the text. On the other hand, the recipient user can recognize the telephone number, address, etc. that are added to the received message, automatically dial the telephone number and acquire map information from a site indicated by the map link information to display the map information on a screen by, for example, simply clicking on the telephone number and the URL, respectively. In addition, the email processing system can be operated on a commercial basis easily because it can be set up merely by providing the mail server 3 for connection to the Internet and because it renders services to registered users.

As an alternative to the email processing system according to the above-disclosed embodiment in which telephone number data and map link information are added to message text, only one of these information items may be added to message text. In this case, it may be arranged such that a sender user selects one item by operating the terminal 1 in a predetermined manner.

As another alternative to the email processing system according to the above-disclosed embodiment in which a recipient user uses the Phone To function to make a telephone call and the Map Link function to acquire map information, the invention may be applied even to the case where a recipient user receives email that includes a telephone number and an address respectively having nothing to do with the Phone To and Map Link functions. Even in this case, the recipient user can recognize the telephone number and the address on the email and the sender user can dispense with the troublesome operation of inserting the telephone number and the address, to their advantage.

As still another alternative to the email processing system according to the above-disclosed embodiment in which email is sent to a cellular telephone 2, email may be sent to diverse types of terminals, other than the cellular telephones 2. For example, email may be sent to portable information terminals having telephone functions. In this case, a map can be displayed on their display with better visibility than in the cellular telephones 2, although the sender and recipient users cannot have a telephone conversation. Additionally, the present email service can be rendered when one or both of the email sender and recipient are the terminals 1 such as PCs, or when one or both of them are the cellular telephones 2, and the invention can be applied to a variety of combinations.

As described in the foregoing, according to the invention, email is forwarded to one or more recipients with predetermined items of user information automatically added thereto, whereby a user sending the email can provide the recipients with useful information, without having to perform troublesome operations. The invention also allows the recipients to automatically make a telephone call and/or view a map image based on the predetermined items of user information which have been added to the email as mentioned above, whereby email become more convenient.

The entire disclosure of Japanese Patent Application No. 2001-067210 filed on Mar. 9, 2001 including the specification, claims, drawings and summary is incorporated herein by reference in its entirety.

What is claimed is:

1. An electronic mail processing system that processes email messages sent via a network, said system comprising:
   a plurality of terminals each provided with a function to send and receive the email messages through said network;
   a user information storage device for storing user information corresponding to registered users;
   an email adding device for referencing said user information storage device upon receipt of each of the email messages sent from said terminals, acquiring at least one predetermined item of said user information corresponding to users using said terminals, and adding said item of said user information to the email message; and
   an email forwarding device for forwarding the email message to which said predetermined item of said user information is added, to said terminals specified as recipients,
   wherein said user information includes telephone number data, wherein said email adding device adds the telephone number data to the email message, and wherein said plurality of terminals include terminals having a telephone function by which a call operation is initiated to a link indicated by the telephone number data based on a predetermined operation of selection of a telephone number corresponding to the telephone number data, and confirmation of the selection.

2. An electronic mail processing system according to claim 1, wherein said user information includes position information, and wherein said email adding device adds the position information to the email message.

3. An electronic mail processing system according to claim 1,
   wherein said user information includes position information and map link information corresponding to the position information, and wherein said email adding device adds the map link information to the email message,
   wherein said plurality of terminals include terminals having an Internet access function and a display device, and
   wherein when said email forwarding device forwards the email message to which the map link information is added, the Internet access function allows map information to be acquired from an Internet site indicated by the map link information based on a predetermined operation, to display an image corresponding to the map information on said display device.

4. An electronic mail processing system according to claim 1, wherein said plurality of terminals include portable terminals each provided with a function to send and receive the email messages by radiocommunication via base stations.

5. An electronic mail processing system according to claim 4, wherein said portable terminals include portable terminals provided with said telephone function.

6. A mail server for processing email messages sent via a network to which a plurality of terminals are connected, said mail server comprising:
   a user information storage device for storing user information corresponding to registered users;
   an email adding device for referencing said user information storage device upon receipt of each of the email messages sent from said terminals, acquiring at least one predetermined item of said user information corresponding to users using said terminals, and adding said item of said user information to the email message; and
   an email forwarding device for forwarding the email message to which said predetermined item of said user information is added, to said terminals specified as recipients,
   wherein said user information includes telephone number data, and wherein said email adding device adds the telephone number data to the email message to enable a user to initiate a call operation to a link indicated by the telephone number data based on a predetermined operation of selection of a telephone number corresponding to the telephone number data, and confirmation of the selection.

7. A mail server according to claim 6, wherein said user information includes position information, and wherein said email adding device adds the position information to the email message.

8. A mail server according to claim 6,
   wherein said user information includes position information and map link information corresponding to the position information, and wherein said email adding device adds the map link information to the email message.

9. An electronic mail processing system according to claim 2, wherein said plurality of terminals include portable terminals each provided with a function to send and receive the email messages by radiocommunication via base stations.

10. An electronic mail processing system according to claim 3, wherein said plurality of terminals include portable terminals each provided with a function to send and receive the email messages by radiocommunication via base stations.

* * * * *